Patented June 5, 1945

2,377,685

UNITED STATES PATENT OFFICE 2,377,685

PRODUCTION OF CHLORINATED PHTHALOCYANINES

Arthur Lawrence Fox, Easton, Pa., and Kenneth Carl Johnson, Claymont, Del., assignors to E. I. du Pont de Nemours & Company, Wilmington, Del., a corporation of Delaware No Drawing. Application March 12, 1943, Serial No. 478,990

8 Claims. (Cl. 260—314.5)

This invention relates to coloring matters of the phthalocyanine series. More particularly, this invention deals with an improved process for the manufacture of halogenated metal phthalocyanines.

In practice of the art heretofore, the manufacture of halogenated metal phthalocyanines was effected by two principal processes: (1) Synthesis of a phthalocyanine compound from halogenated intermediates; (2) Synthesis of a phthalocyanine compound from non-halogenated initial material, isolating the color and then subjecting the same to halogenation in special media, for instance nitrobenzene, molten phthalic anhydride or an aluminum-chloride-sodium-chloride melt.

For the production of highly-halogenated phthalocyanine, say over 14 halogen atoms per molecule, only the second mode of operation can be considered, inasmuch as the first mode is limited in applicability to the production at most of an octachloro-phthalocyanine. Yet, even this method is limited as to choice of diluents, since aromatic liquids generally cannot withstand the vigorous halogenation conditions required for the production of highly halogenated phthalocyanines, while common aliphatic solvents have little or no solvent power for phthalocyanine compounds. On a practical scale, about the only dependable diluent for introducing over 14 chlorine atoms into copper-phthalocyanine has been heretofore a mixture of aluminum chloride and sodium chloride in eutectic ratio.

It is accordingly an object of this invention to find additional methods for the production of highly-chlorinated copper-phthalocyanine. A further object of this invention is to find a method for producing highly-chlorinated copper-phthalocyanine which will not depend upon the use of aluminum chloride. Other and further important objects of this invention will appear as the description proceeds.

Now, we have found that highly chlorinated phthalocyanines, especially copper-phthalocyanine, can be produced successfully by the employment of sulfur dichloride in the joint capacity of halogenating agent and diluent. The reaction is carried out in a closed vessel, preferably one provided with bleeding-off valves to control the maximum pressure within the vessel, and is further aided by the presence of a halogenation catalyst. Common halogenation catalysts for this purpose are cupric chloride, zinc chloride, aluminum chloride, nickel chloride, or antimony trichloride, but best results are obtained by using a catalyst containing iron, for instance ferric chloride or a mixture of ferric chloride with other catalysts.

Sulfur dichloride is a brown liquid which boils with decomposition at about 69° C. It may be readily prepared by passing chlorine into sulfur monochloride. Some authorities regard this liquid as a solution of sulfur tetrachloride in sulfur monochloride. It does, however, exist in commerce under the name of sulfur dichloride and may be obtained in drums from certain manufacturers. It will be clear, therefore, that when we speak of sulfur dichloride in this specification and claims, we are referring to the brown liquid obtainable by passing chlorine gas into sulfur monochloride, regardless what its exact chemical structure is.

That sulfur dichloride would act as a halogenating agent at the relatively high temperature employed in this process without simultaneously introducing sulfur is a very surprising discovery. Sulfur dichloride has been noted in the literature as a vulcanizing agent, which is inherently a process of sulfurization. Furthermore, when heated to the distillation point, sulfur dichloride breaks down into sulfur monochloride and chlorine, of which the former is definitely a sulfurizing agent. That as much as 12 or 14 chlorine atoms could be introduced into the phthalocyanine molecule without at the same time introducing sufficient sulfur to affect the practical quality of the pigment was not to be foreseen.

Returning now to the thermal decomposition of sulfur dichloride, the same may be expressed by the following equation: $2SCl_2 \rightarrow S_2Cl_2 + Cl_2$. Since in chlorinations one-half of the $Cl_2$ employed goes to form HCl, it is clear that the minimum required for chlorination is 2 moles of $SCl_2$ for each atom of Cl which it is desired to introduce. In actual practice, a considerable excess over the above quantity is recommended, since it is desired to have this liquid function as a diluent as well. The correct proportion to be used will therefore be determined by the quantity needed to produce a fluid, stirrable mass. We have found that a quantity about 13 to 15 times the weight of phthalocyanine pigment being treated gives the desired result, although larger quantities of sulfur dichloride may be employed, if desired.

As the pressure in the vessel rises, due to both the higher temperature and the liberation of HCl, it is recommended to bleed off the gases formed so as to keep the pressure inside the vessel at about 50 to 100 lbs. per square inch. Higher pressures, even up to 600 lbs. per square inch, will operate but are not practical, since they require special high-pressure apparatus constructed of expensive, non-corrosive materials.

When the reaction has been completed, the color may be recovered from the excess diluent and by-products in any suitable manner; but we find it most convenient to remove the liquids by a special distillation procedure using a sweep of chlorine gas. The chlorine acts first of all as a chemical agent, converting the by-product sulfur monochloride into sulfur dichloride, thereby reducing its boiling point to well below 138° C. Secondly, it acts as a physical gas-sweep, in a manner similar to the action of steam in steam-distillations. This process removes the diluent with minimum handling, and at the same time converts it into sulfur dichloride, useful for repeating the operation in the next batch. The high economy of this process is self-evident.

Without limiting our invention to any particular details, the following examples are given to illustrate our preferred mode of operations. Parts mentioned are by weight.

Example 1

300 parts of copper phthalocyanine, 27 parts of anhydrous ferric chloride and 3800 parts of sulfur dichloride were charged into an enamelled autoclave and heated to 150° C. over a period of two and one-quarter hours and maintained at that temperature for six hours. The reaction mass was cooled, diluted with 4000 pts. of carbon tetrachloride, filtered, washed with carbon tetrachloride until free of sulfur, and dried at 100° C. When acid pasted, the recovered product contained 46.9% chlorine.

Example 2

A similar run to the previous one was carried out, employing 4500 parts of sulfur dichloride in lieu of the quantity specified in the preceding example. This gave a more fluid halogenation mass which could be handled as a liquid, without dilution. The product after washing with carbon tetrachloride contained 47.66% chlorine. A test run carried out under similar conditions except that the reaction mass was held at 150° C. for twelve hours instead of six showed no substantial increase in the amount of chlorine introduced and no other significant changes in the qualities of the product.

Example 3

150 parts of copper phthalocyanine, 14 parts of anhydrous ferric chloride and 1900 parts of sulfur dichloride were heated in a sealed vessel to 175° C. for six hours. The mass was drowned in 16,000 parts of 10% sodium hydroxide solution, filtered, washed and dried. The resulting color, after acid pasting, contained 47.3% chlorine.

Example 4

300 parts of copper phthalocyanine, 27 parts of ferric chloride and 4500 parts of sulfur dichloride were heated in a closed vessel, fitted with a nickel reflux condenser to permit bleeding off the pressure from time to time. As a temperature of 84° C. was reached, the pressure rose to 150 lbs. per sq. in. This was reduced to 100 lbs. by bleeding off the excess of hydrogen chloride. On continued heating to about 100° C. the pressure again rose to 150 lbs. and was again released to 100 lbs. When the temperature reached 150° C., no further increase in pressure was observed. The charge was held at this temperature for six hours, cooled to room temperature and drowned in a quantity of 16% caustic soda solution sufficient to hydrolyze the excess sulfur chloride, and to render the mass alkaline. After filtering, washing and drying, the crude material was acid pasted, and then contained 47% chlorine.

Example 5

1500 parts of copper phthalocyanine, 135 parts of anhydrous ferric chloride and 22,700 parts of sulfur dichloride were charged into an enamel autoclave and heated to 150° C. for two hours, while controlling the pressure at 100 lbs. per sq. in. by bleeding off any excess which developed. The charge was then cooled; a condenser was attached to the equipment, and chlorine gas was passed into the charge at a temperature of 100 to 110° C. The distillate was maintained at 110-130° C. and there was recovered a liquid corresponding in sulfur and chlorine content essentially to sulfur dichloride. The charge was worked up in the same manner as in the preceding examples, and after acid pasting contained 48.07% chlorine.

Example 6

1500 parts of metal-free phthalocyanine, 96 parts of antimony trichloride (SbCl₃) and 22,700 parts of technical sulfur dichloride were charged into an enamel autoclave and heated slowly over a period of 4½ hrs. until the temperature finally reached 163° C. During this heating period the pressure was controlled at 100 lbs. per sq. in. by bleeding off the excess which developed after the temperature had reached 78° C., and while heating up to 155° C., until no further increase in pressure was observed. The charge was then cooled and stirred into sufficient aqueous caustic soda solution of 15% NaOH content to maintain alkalinity after complete hydrolysis or neutralization of the excess sulfur chlorides and acid. The alkaline slurry was then filtered and the pigment washed with water free of water soluble material. The cake was dried at 100° C. and the crude product was acid pasted from cold monohydrate, giving a product which contained 45.4% chlorine. This chlorine content corresponds closely to 12 chlorine atoms per phthalocyanine molecule. The acid pasted pigment was free of antimony and contained only traces of sulfur. When tested for use in printing inks and paints, the product gave an attractive green shade, somewhat bluer than highly chlorinated copper phthalocyanine, and showed the excellent tinctorial strength and outstanding fastness properties common to commercial pigments of the phthalocyanine class.

Example 7

The procedure of this example is particularly suitable for technical scale operation in standard equipment. Charge 60 parts of copper phthalocyanine into an autoclave together with a catalyst mixture consisting of 2.0 parts of selenium metal, 0.8 of anhydrous ferric chloride and 6.0 parts of sulfuryl chloride. After closing the autoclave, run in 900 parts of sulfur dichloride from a storage tank and heat the charge to 150° C. over a period of two hours. Hold the pressure at 150 lbs. by bleeding off hydrogen chloride gas through a suitable reflux condenser to return the liquid sulfur dichloride. Hold the charge from two to four hours at a temperature of 150° C. and then discharge into a nickel-lined graining bowl. Sulfur dichloride recovery may be carried out by passing a stream of chlorine gas over the surface of the material in the graining bowl at 60–70° C. This converts the sulfur monochloride produced in the process to sulfur dichloride which can then be employed again. The solid product from the graining bowl may be acid-pasted by conventional methods.

In a similar manner, in lieu of copper or metal-free phthalocyanine, other members of the phthalocyanine series may be chlorinated. Also, in lieu of copper phthalocyanine a partially chlorinated copper phthalocyanine may be used as initial material, as for instance copper-monochloro-phthalocyanine or a tetrachloro or octachloro compound made synthetically according to the methods mentioned in the introductory pages of this specification.

The initial sulfur dichloride required in the above examples may generally be prepared by passing chlorine at room temperature into sulfur monochloride at atmospheric pressure until the chlorine is no longer readily absorbed. The resulting liquid then contains very nearly the amount of chlorine theoretically required for sulfur dichloride. Higher quantities of chlorine may be passed in, since part of it will dissolve in the sulfur dichloride produced. Commercial sulfur dichloride or sulfur dichloride recovered from a previous operation may also be employed.

Other permissible variations and modifications will be readily apparent to those skilled in the art. It will be clear from the above description that our invention provides a simple process possessing several valuable advantages from the practical viewpoint. In the first place, our invention adds a new diluent to the very limited list available for this purpose heretofore, and, furthermore, it provides a diluent which is more readily available under emergency conditions than some of the others hitherto employed. Secondly, in our invention, the same agent functions as a chlorinating agent and solvent or diluent. Thirdly, the excess diluent and by-products lend themselves readily to separation from the dyestuff, as for instance by distillation, with or without the aid of a chlorine sweep. Fourthly, the principal by-product of the reaction (sulfur monochloride) is readily converted into the original agent (sulfur dichloride) for reuse in subsequent operations; and, finally, this conversion may be effected automatically during the separation step, by the aid of a chlorine sweep as above indicated, thereby avoiding the necessity of separate treatment.

We claim:

1. A process of producing a chlorinated phthalocyanine compound which comprises subjecting a phthalocyanine compound, in a closed vessel and at a temperature above 100° C. to the action of a liquid reagent obtainable by passing chlorine gas into sulfur monochloride and having a sulfur-chlorine composition corresponding approximately to the formula $SCl_2$, said liquid reagent being employed in sufficient quantity to function both as a chlorinating agent and as a diluent for the reaction.

2. A process of producing chlorinated copper phthalocyanine which comprises subjecting copper phthalocyanine, in a closed vessel and at a temperature between 100 and 175° C., to the action of a liquid chlorinating agent consisting predominantly of sulfur dichloride in an excess of the latter, whereby the latter may function both as a chlorinating agent and as a diluent.

3. A process of producing chlorinated copper phthalocyanine which comprises heating copper phthalocyanine with a liquid chlorinating agent consisting predominantly of sulfur dichloride under pressure and at a temperature of about 150° C., in the presence of a catalyst.

4. A process of producing chlorinated copper phthalocyanine which comprises heating copper phthalocyanine with an excess of a liquid chlorinating agent consisting predominantly of sulfur dichloride in a closed vessel and at a temperature of about 150° C., in the presence of a catalyst comprising ferric chloride.

5. A process of producing chlorinated copper phthalocyanine which comprises heating copper phthalocyanine in a closed vessel and at a temperature of about 150° C., with from 13 to 15 times its own weight of a liquid chlorinating agent consisting predominantly of sulfur dichloride, in the presence of a catalyst comprising ferric chloride, and separating the resulting chlorinated copper phthalocyanine from the excess liquids.

6. A process of producing chlorinated copper phthalocyanine which comprises heating copper phthalocyanine in a closed vessel and at a temperature of about 150° C. with from 13 to 15 times its own weight of a liquid chlorinating agent consisting predominantly of sulfur dichloride, in the presence of a catalyst comprising ferric chloride and then removing the excess liquid by distillation.

7. A process for producing highly chlorinated copper phthalocyanine which comprises heating copper phthalocyanine in a closed vessel at a temperature of about 150° C., but at a pressure not exceeding 150 lbs. per sq. in., with from 13 to 15 times its own weight of a liquid chlorinating agent consisting predominantly of sulfur dichloride, in the presence of a catalyst comprising ferric chloride; then passing a stream of chlorine gas through the mass to distill off the liquid diluents and by-products, and recovering the residual color mass.

8. A process of producing a chlorinated phthalocyanine compound which comprises subjecting a phthalocyanine compound, in the presence of a chlorination catalyst, to the action of a liquid reagent obtainable by passing chlorine gas into sulfur monochloride and having a sulfur-chlorine composition corresponding approximately to the formula $SCl_2$, said liquid reagent being employed in quantity to function both as a chlorinating agent and a diluent for the reaction, and said action being effected at a temperature between 100 and 175° C. in a closed vessel.

ARTHUR LAWRENCE FOX.
KENNETH CARL JOHNSON.